(12) United States Patent
Yu et al.

(10) Patent No.: US 12,495,047 B2
(45) Date of Patent: Dec. 9, 2025

(54) INTERNET ACCESS MANAGEMENT SERVICE SERVER THAT CAN MANAGE INTERNET ACCESS FOR ELECTRONIC TERMINALS THROUGH SETTING OF SCHEDULING RULES FOR INTERNET USE RESTRICTION AND THE OPERATING METHOD THEREOF

(71) Applicant: FRANKLIN TECHNOLOGY INC., Seoul (KR)

(72) Inventors: Changsoo Yu, Hwaseong-si (KR); Ok Chae Kim, Seoul (KR)

(73) Assignee: FRANKLIN TECHNOLOGY INC., Seoul (KR)

( * ) Notice: Subject to any disclaimer, the term of this patent is extended or adjusted under 35 U.S.C. 154(b) by 173 days.

(21) Appl. No.: 18/241,248

(22) Filed: Sep. 1, 2023

(65) Prior Publication Data

US 2024/0187419 A1    Jun. 6, 2024

(30) Foreign Application Priority Data

Oct. 25, 2022    (KR) .................. 10-2022-0138399

(51) Int. Cl.
*H04L 9/40*    (2022.01)
(52) U.S. Cl.
CPC ........ *H04L 63/108* (2013.01); *H04L 63/0236* (2013.01); *H04L 63/0876* (2013.01); *H04L 63/20* (2013.01)

(58) Field of Classification Search
CPC ............... H04L 63/108; H04L 63/0236; H04L 63/0876; H04L 63/20
See application file for complete search history.

(56) References Cited

U.S. PATENT DOCUMENTS

| | | | |
|---|---|---|---|
| 2020/0014686 A1* | 1/2020 | Liu | H04L 63/20 |
| 2021/0042724 A1* | 2/2021 | Rathod | G07G 1/0054 |

FOREIGN PATENT DOCUMENTS

| | | |
|---|---|---|
| KR | 10-0483558 B1 | 4/2005 |
| KR | 10-0780393 B1 | 11/2007 |
| KR | 10-2014-0024650 A | 3/2014 |
| KR | 10-1511474 B1 | 4/2015 |
| KR | 10-1738468 B1 | 5/2017 |
| KR | 10-1874395 B1 | 7/2018 |
| KR | 10-2421567 B1 | 7/2022 |
| KR | 10-2421572 B1 | 7/2022 |

\* cited by examiner

*Primary Examiner* — Khoi V Le
(74) *Attorney, Agent, or Firm* — Park, Kim & Suh, LLC

(57) ABSTRACT

Disclosed are an Internet access management service server that can manage Internet access for electronic terminals through setting of scheduling rules for Internet use restriction and the operating method thereof to support an administrator to more easily perform Internet use restriction setting for the electronic terminal.

11 Claims, 2 Drawing Sheets

INTERNET ACCESS MANAGEMENT SERVICE SERVER THAT CAN MANAGE INTERNET ACCESS FOR ELECTRONIC TERMINALS THROUGH SETTING OF SCHEDULING RULES FOR INTERNET USE RESTRICTION AND THE OPERATING METHOD THEREOF

CROSS-REFERENCE TO RELATED APPLICATIONS

This application claims priority to and the benefit of Korean Patent Application No. 10-2022-0138399 filed in the Korean Intellectual Property Office on Oct. 25, 2022, the entire contents of which are incorporated herein by reference.

TECHNICAL FIELD

The present disclosure relates to an Internet access management service server that can manage Internet access for electronic terminals through setting of scheduling rules for Internet use restriction and the operating method thereof.

BACKGROUND ART

Recently, as various Internet-capable electronic terminals such as desktop PCs, smart phones, and tablet PCs are spread, the use of the Internet using these electronic terminals is increasing.

On the Internet, there are many webpages that deliver beneficial information to users, but there are also many webpages that contain harmful information, so it is necessary for guardians to appropriately control Internet use through methods such as blocking access to webpages containing harmful contents or limiting Internet usage time for users who are still lacking in self-control, such as children and adolescents.

In addition, companies and institutions often use the Internet for work, and in that there are many cases in which employees access webpages containing content unrelated to work during work hours, in order to increase work efficiency, it is necessary to properly control Internet use.

In general, in that a microprocessor for controlling an operation of the electronic terminal is mounted on most electronic terminals capable of accessing the Internet, a predetermined setting for Internet use restriction can be made on the electronic terminal by using the microprocessor. For example, a control application for predetermined Internet use function restriction is installed in the electronic terminal to set the electronic terminal not access a specific webpage or to access the Internet only for a predetermined Internet access allowance time.

In this regard, if a service which supports an administrator to perform Internet access management setting for a predetermined electronic terminal is introduced, it will be possible to more easily prevent persons to be managed such as children or adolescents from accessing an inappropriate webpage through the electronic terminal or indiscreetly using the Internet.

SUMMARY OF THE INVENTION

The present disclosure has been made in an effort to provide an Internet access management service server that can manage Internet access for electronic terminals through setting of scheduling rules for Internet use restriction and the operating method thereof to support an administrator to more easily perform Internet use restriction setting for the electronic terminal.

An exemplary embodiment of the present disclosure provides an Internet access management service server that can manage internet access for electronic terminals through setting of scheduling rules for Internet use restriction, which includes: a code transmission unit generating, when receiving, from a management terminal of an administrator, a processing request for a registration procedure for registering a terminal to be subjected to Internet access management, an identification code for identifying a connection session with the management terminal, and transmitting the generated identification code to the management terminal; a registration unit identifying, when receiving first unique identification information specified to a first electronic terminal jointly with the identification code from the first electronic terminal which becomes the subject of the Internet access management, which acquires the identification code transmitted from the management terminal, the connection session with the management terminal based on the identification code, and storing the first unique identification information as the unique identification information for the terminal which becomes the subject of the Internet access management specified by the administrator in the management list database; a setting request unit transmitting a setting request instruction for requesting setting a scheduling rule for the Internet access management of the first electronic terminal to the management terminal; and an instruction transmission unit transmitting, when first schedule rule information (the first schedule rule information is information constituted by a filtering rule for identifying a webpage which becomes a subject of access blocking and information on an Internet use restriction time) is received from the management terminal in response to the setting request instruction, storing the first schedule rule information in the management list database to correspond to the first unique identification information, and then, transmitting the first schedule rule information to the first electronic terminal, and simultaneously transmitting a control instruction for instructing the first electronic terminal to restrict an Internet use function according to the first schedule rule information.

Another exemplary embodiment of the present disclosure provides an operating method of an Internet access management service server that can manage internet access for electronic terminals through setting of scheduling rules for Internet use restriction, which includes: generating, when receiving, from a management terminal of an administrator, a processing request for a registration procedure for registering a terminal to be subjected to Internet access management, an identification code for identifying a connection session with the management terminal, and transmitting the generated identification code to the management terminal; identifying, when receiving first unique identification information specified to a first electronic terminal jointly with the identification code from the first electronic terminal which becomes the subject of the Internet access management, which acquires the identification code transmitted from the management terminal, the connection session with the management terminal based on the identification code, and storing the first unique identification information as the unique identification information for the terminal which becomes the subject of the Internet access management specified by the administrator in the management list database; transmitting a setting request instruction for requesting setting a scheduling rule for the Internet access management of the first electronic terminal to the management terminal;

and transmitting, when first schedule rule information (the first schedule rule information is information constituted by a filtering rule for identifying a webpage which becomes a subject of access blocking and information on an Internet use restriction time) is received from the management terminal in response to the setting request instruction, storing the first schedule rule information in the management list database to correspond to the first unique identification information, and then, transmitting the first schedule rule information to the first electronic terminal, and simultaneously transmitting a control instruction for instructing the first electronic terminal to restrict an Internet use function according to the first schedule rule information.

According to exemplary embodiments of the present disclosure, an Internet access management service server can manage Internet access for electronic terminals through setting of scheduling rules for Internet use restriction and the operating method thereof are provided to support an administrator to more easily perform Internet use restriction setting for the electronic terminal.

DETAILED DESCRIPTION

Figure 1:
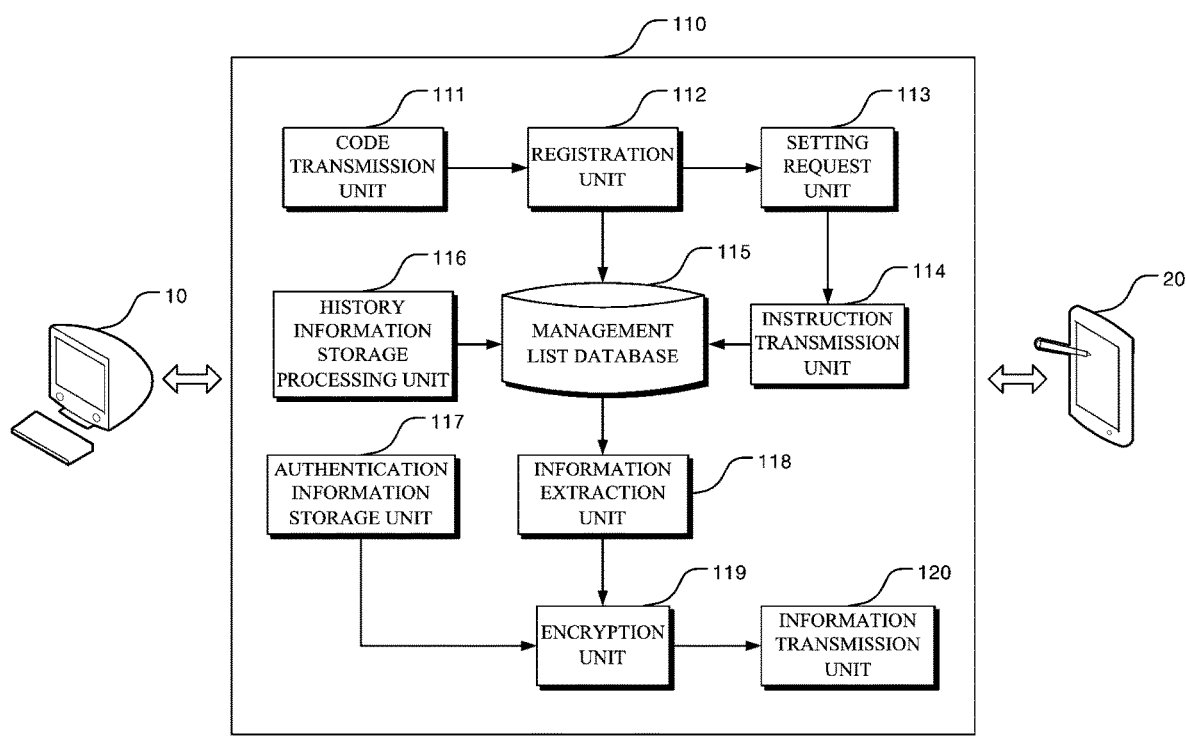
FIG. 1 is a diagram illustrating a structure of an Internet access management service server that can manage internet access for electronic terminals through setting of scheduling rules for Internet use restriction according to an exemplary embodiment of the present disclosure.

Hereinafter, exemplary embodiments of the present disclosure will be described in detail with reference to the accompanying drawings. The description does not limit the present disclosure to specific exemplary embodiments, and it should be understood that the present disclosure covers all the modifications, equivalents and replacements included within the idea and technical scope of the present disclosure. In describing each drawing, like reference numerals refer to like elements and if not contrarily defined, all terms used herein including technological or scientific terms have the same meanings as those generally understood by a person with ordinary skill in the art.

In the present disclosure, unless explicitly described to the contrary, the word "comprise" and variations such as "comprises" or "comprising", will be understood to imply the inclusion of stated elements but not the exclusion of any other elements. Further, in various exemplary embodiments of the present disclosure, each of components, functional blocks or means may be constituted by one or more lower components and electrical, electronic, and mechanical functions performed by respective components may be implemented as various known devices or mechanical elements including an electronic circuit, an integrated circuit, an Application Specific Integrated Circuit (ASIC), etc., and the respective components may be separately implemented or two or more components may be integrated into one and implemented.

Meanwhile, blocks of the accompanying block diagram or steps of a flowchart may be appreciated as meaning compute program instructions mounted on a processor or a memory of data processible equipment such as a universal computer, a special computer, a portable notebook computer, a network computer, etc., and performing specified functions. Since the computer program instructions may be stored in a memory provided in a computer device or a computer readable memory, functions described in blocks of a block diagram or steps of a flowchart may be produced as a manufactured object including an instruction mean performing the functions. Moreover, each block or each step may represent a part of a module, a segment, or a code that includes one or more executable instructions for executing a specified logical function(s). It should also be noted that in some replaceable embodiments, the functions mentioned in the blocks or steps may also be executed differently from a predetermined order. For example, two blocks or steps that are subsequently illustrated are substantially simultaneously carried out, or may be performed in a reverse order, and in some cases, the functions may be performed while some blocks or steps are omitted.

FIG. 1 is a diagram illustrating a structure of an Internet access management service server that can manage internet access for electronic terminals through setting of scheduling rules for Internet use restriction according to an exemplary embodiment of the present disclosure.

Referring to FIG. 1, the Internet access management service server 110 according to the present disclosure includes a code transmission unit 111, a registration unit 112, a setting request unit 113, and an instruction transmission unit 114.

When the code transmission unit 111 receives, from a management terminal 10 of an administrator, a processing request for a registration procedure for registering a terminal to be subjected to the Internet access management, the code transmission unit 111 generates an identification code for identifying a connection session with the management terminal 10, and transmits the generated identification code to the management terminal 10.

At this time, according to an exemplary of the present disclosure, when the code transmission unit 111 receives the processing request for the registration procedure from the management terminal 10, the code transmission unit 111 may generate a t (t is a natural number of 2 or more)-digit random one-time number, and then transmit the one-time number to the management terminal 10 as the identification code.

In this case, according to an exemplary embodiment of the present disclosure, when the management terminal 10 receives the identification code from the Internet access management service server 110, the management terminal 10 may display the identification code on a screen. Then, the administrator may apply the identification code as an input to the first electronic terminal 20, which becomes the subject of the Internet access management, and at this time, when the first electronic terminal 20 receives the identification code input by the administrator, the first electronic terminal 20 may extract first unique identification information specified to the first electronic terminal 20, and transmit, to the Internet access management service server 110, the first unique identification information together with the identification code.

Here, the first unique identification information which means unique information for identifying the first electronic terminal 20 may be a Media Access Control (MAC) address, an International Mobile Equipment Identity (IMEI), an IP address, Token, UUID, etc.

According to another exemplary embodiment of the present disclosure, when the management terminal 10 receives the identification code from the Internet access management service server 110, the management terminal 10 may generate a 2D (dimensional) code inserted with the identification code, and display the 2D code on the screen. Here, the 2D code refers to a code capable of inserting various information on a 2D image pattern, and a quick response (QR) code, veri code, a dot code, and the like may be used.

As such, when the management terminal 10 displays the 2D code on the screen, the administrator may scan the 2D code displayed on the screen of the management terminal 10 through a camera mounted on the first electronic terminal 20. Then, the first electronic terminal 20 may acquire the identification code from the 2D code scanned through the camera, and when the identification code is acquired, the first electronic terminal 20 may extract the first unique identification information specified to the first electronic terminal 20, and transmit, to the Internet access management service server 110, the first unique identification information together with the identification code.

As such, when the Internet access management service server 110 receives the first unique identification information specified to the first electronic terminal 20 jointly with the identification code from the first electronic terminal 20 which becomes the subject of the Internet access management, which acquires the identification code transmitted from the management terminal 10, the registration unit 112 identifies the connection session with the management terminal 10 based on the identification code, and stores the first unique identification information as the unique identification information for the terminal which becomes the subject of the Internet access management specified by the administrator in the management list database 115.

When the first unique identification information is stored in the management list database 115, the setting request unit 113 transmits a setting request instruction for requesting setting scheduling rules for the Internet access management of the first electronic terminal 20 to the management terminal 10.

Then, the administrator may set a predetermined scheduling rule through the management terminal 10 in response to the setting request instruction received by the management terminal 10. In this case, the administrator may set first schedule rule information constituted by a filtering rule for identifying a webpage which becomes the subject of access blocking and information on the Internet use restriction time, as a scheduling rule to be specified for the first electronic terminal 20.

Here, the filtering rule as a rule configured based on a plurality of first blocking keywords set by the administrator means a rule specified to block the access of the first electronic terminal 20 to the first webpage if it is judged that there is at least one word in which a word similarity (the word similarity as a similarity calculated based on an embedding vector for each word generated by performing word embedding based on a semantic similarity mutually predetermined between words means a vector similarity between embedding vectors specified in respective words) with the plurality of first blocking keywords within the domain name of the first webpage and the text body of the first webpage is equal to or more than a predetermined reference value when the first electronic terminal 20 attempts to access the first webpage.

In this regard, the administrator may set the first schedule rule information constituted by a filtering rule constituted by a plurality of first blocking keywords shown in Table 1 below and information on an Internet use restriction time shown in Table 2 below through the management terminal 10.

TABLE 1

| Plurality of first blocking keywords |
|---|
| Gambling |
| Coin |
| Bizarre |
| . . . |

TABLE 2

| Internet use restriction time (time for which use is not permitted) |
|---|
| 0 to 6 o'clock |
| 12 to 13 o'clock |
| 18 to 20 o'clock |
| . . . |

When it is assumed that the plurality of first blocking keywords is set as in Table 1 above and the Internet use restriction time is set as in Table 2 above, the first schedule rule information may be a rule to specify, when it is judged that there is at least one word in which the word similarity with 'gambling, coin, and bizarre, . . . ' among a domain name of the webpage to be accessed by the first electronic terminal 20 and a text disclosed in the text body is equal to or more than the reference value, blocking the access to the webpage, and at the same time, a rule to specify preventing the first electronic terminal 20 from accessing the Internet for the Internet use restriction time shown in Table 2 above.

As such, when the administrator sets the first schedule rule information on the management terminal 10, the management terminal 10 may transmit the first schedule rule information to the Internet access management service server 110.

As a result, when the Internet access management service server 110 receives the first schedule rule information from the management terminal 10, the instruction transmission unit 114 stores the first schedule rule information in the management list database 115 to correspond to the first unique identification information, and then transmits the first schedule rule information to the first electronic terminal 20 and simultaneously, transmits a control instruction for instructing the first electronic terminal 20 to restrict an Internet use function according to the first schedule rule information.

Then, the first electronic terminal 20 may restrict the Internet use function of the first electronic terminal 20 according to the first schedule rule information based on the control instruction. Specifically, a predetermined control application which operates in a background may be installed in the first electronic terminal 20 in order to execute the control instruction. In this case, when the first electronic terminal 20 receives the first schedule rule information and the control instruction from the Internet access management service server 110 of the present disclosure, the first electronic terminal 20 registers the first schedule rule information on the control application by driving the control application, and then executes the control instruction to restrict the Internet use function of the first electronic terminal 20 according to the first schedule rule information. That is, the first electronic terminal 20 may block the access to the webpage according to the filtering rule included in the first schedule rule information, and control the first electronic terminal 20 to access the Internet only for the time for which the Internet use is permitted according to the Internet use restriction time included in the first schedule rule information.

According to an exemplary embodiment of the present disclosure, when the first electronic terminal 20 receives the first schedule rule information and the control instruction from the Internet access management service server 110, the first electronic terminal 20 may restrict the Internet use of the first electronic terminal 20 according to the first schedule rule information based on the control instruction, and generate Internet blocking history information constituted by date/time information for a time when Internet access blocking occurs and information on a blocked webpage whenever the Internet access blocking according to the first schedule rule information occurs, and feed back the generated Internet blocking history information to the Internet access management service server 110.

For example, when the access blocking occurs according to the first schedule rule information while the first electronic terminal 20 attempts accessing 'webpage 1' at '12:13:20 on Oct. 3, 2022', the first electronic terminal 20 may generate Internet blocking history information constituted by the date/time information 'at 12:13:20 on Oct. 3, 2022' and information on 'webpage 1', and feed back the generated Internet blocking history information to the Internet access management service server 110.

In this case, when the access blocking occurs according to the first schedule rule information while the first electronic terminal 20 attempts accessing the Internet for the time for which the Internet use is restricted, access blocking which is irrespective of the webpage occurs, so the first electronic terminal 20 may generate the Internet blocking history information constituted only by the date/time information for the time when the Internet access blocking occurs, and feed back the generated Internet blocking history information to the Internet access management service server 110.

In this case, according to an exemplary embodiment of the present disclosure, the Internet access management service server 110 may store the Internet blocking history information in the management list database 115 to correspond to the first unique identification information whenever the Internet blocking history information is fed back from the first electronic terminal 20.

Through this, the Internet access management service server 110 according to the present disclosure may management the Internet access blocking history information generated by the first electronic terminal 20.

In this case, according to an exemplary embodiment of the present disclosure, the Internet access management service server 110 may further include an authentication information storage unit 117, an information extraction unit 118, an encryption unit 119, and an information transmission unit 120.

The authentication information storage unit 117 stores n (n is a natural number of 2 or more) digits of predetermined authentication number and a predetermined hash function which are shared in advance with the management terminal 10.

When the information extraction unit 118 receives a providing request instruction of the Internet blocking history information for the first electronic terminal 20 during a predetermined first period from the management terminal 10, the information extraction unit 118 extracts, from the management list database 115, at least one first Internet blocking history information including date/time information which belongs to the first period among the Internet blocking history information stored to correspond to the first unique identification information.

For example, when the Internet access management service server 110 receives a providing request instruction of the Internet blocking history information for a period from '12 o'clock on Mar. 4, 2022 to 18 o'clock on May 5, 2022' from the management terminal 10, the information extraction unit 118 may extract, from the management list database 115, at least one first Internet blocking history information including date/time information which belongs to the period from '12 o'clock on Mar. 4, 2022 to 18 o'clock on May 5, 2022' among the Internet blocking history information stored to correspond to the first unique identification information.

The encryption unit 119 randomly generates an n-digit serial number, and then generates a column vector having each digit constituting the serial number as a component and a row vector having each digit constituting the authentication number as a component, and computes a matrix multiplication between the column vector and the row vector to generate an n×n size computation matrix, and then randomly selects a first component which is one of the components constituting the computation matrix, and applies the first component to the hash function as an input to generate a first hash value, and encrypts the at least one first Internet blocking history information based on the first hash value.

For example, when it is assumed that n is '3', the authentication number stored in the authentication information storage unit 117 is '231', and the serial number is randomly generated as in '425', the encryption unit 119 generates $$\begin{bmatrix} 4 \\ 2 \\ 5 \end{bmatrix},$$

which is a column vector having the serial number '425' as the component, generates '[2 3 1]' which is a row vector having the authentication number '231' as the component, and then computes the matrix multiplication between the column vector and the row vector to generate a 3×3 size computation matrix as in $$\begin{bmatrix} 8 & 12 & 4 \\ 4 & 6 & 2 \\ 10 & 15 & 5 \end{bmatrix},$$

Then, the encryption unit 119 randomly selects the first component which is any one of the components constituting the computation matrix as '15', and applies the first component '15' to the hash function stored in the authentication information storage unit 117 as the input to generate the first hash value, and then encrypt the at least one first Internet blocking history information based on the first hash value.

The information transmission unit 120 substitutes the first component with a randomly generated dummy component (the dummy component is generated as a different value from the first component) to generate a substitution matrix in the computation matrix, and encrypts each of the substitution matrix and the serial number with a predetermined public key (a private key forming a key pair with the public key is stored in the management terminal 10), and then transmits the encrypted substitution matrix and the encrypted serial number to the management terminal 10, and at the same time, transmits the at least one encrypted first Internet blocking history information to the management terminal 10.

In this regard, as in the above example, when the computation matrix is generated as in $$`\begin{bmatrix} 8 & 12 & 4 \\ 4 & 6 & 2 \\ 10 & 15 & 5 \end{bmatrix}`,$$

and the first component is '15', the information transmission unit 120 may substitute the component '15' with the random dummy component '27' in the computation matrix to generate the substitution matrix $$`\begin{bmatrix} 8 & 12 & 4 \\ 4 & 6 & 2 \\ 10 & 27 & 5 \end{bmatrix}`,$$

and encrypt each of the substitution matrix and the serial number with the public key, and then transmit the encrypted substitution matrix and the encrypted serial number to the management terminal 10, and at the same time, transmit the at least one encrypted first Internet blocking history information to the management terminal 10.

In this case, according to an exemplary embodiment of the present disclosure, the management terminal 10 store, in advance, the private key, the authentication number, and the hash function in the memory, decrypts, when receiving, from the Internet access management service server 110, the encrypted substitution matrix, the encrypted serial number, and the at least one encrypted first Internet blocking history information, each of the substitution matrix and the serial number based on the private key, and then generate a column vector having respective digits of numbers constituting the decrypted serial number as the component and a row vector having respective digits of numbers constituting the authentication number stored in the memory as the component, and computes the matrix multiplication between the column vector and the row vectors to generate the computation matrix having an n×n size, and then compare the computation matrix and the decrypted substitution matrix, and extract a component in the computation matrix, which does not match the substitution matrix as the first component, and apply the first component to the hash function stored in the memory as the input to calculate the first hash value, and then decrypt the at least one encrypted first Internet blocking history information based on the first hash value.

In this regard, as in the above example, if the authentication number and the serial number are '231' and '425', respectively, and the computation matrix and the substitution matrix are $$`\begin{bmatrix} 8 & 12 & 4 \\ 4 & 6 & 2 \\ 10 & 15 & 5 \end{bmatrix}`, \text{ and } `\begin{bmatrix} 8 & 12 & 4 \\ 4 & 6 & 2 \\ 10 & 27 & 5 \end{bmatrix}`,$$

respectively, when the management terminal 10 receives the encrypted substitution matrix, the encrypted serial number, and the at least one encrypted first Internet blocking history information from the Internet access management service server 110, the management terminal 20 may decrypt each of the encrypted substitution matrix and the encrypted serial number based on the private key, and then generate the column vector having each digit number constituting the decrypted serial number '425 as the component as $$`\begin{bmatrix} 4 \\ 2 \\ 5 \end{bmatrix}`,$$

and generate the row vector having each digit number constituting '231' which is the authentication number stored in the memory as the component as '[2 3 1]'.

Then, the management terminal 10 computes the matrix multiplication between the column vector and the row vector to generate the computation matrix having the 3×3 size as in $$`\begin{bmatrix} 8 & 12 & 4 \\ 4 & 6 & 2 \\ 10 & 15 & 5 \end{bmatrix}`.$$

Thereafter, the management terminal 10 compares the computation matrix $$`\begin{bmatrix} 8 & 12 & 4 \\ 4 & 6 & 2 \\ 10 & 15 & 5 \end{bmatrix}`,$$

and the decrypted substitution matrix $$`\begin{bmatrix} 8 & 12 & 4 \\ 4 & 6 & 2 \\ 10 & 27 & 5 \end{bmatrix}`,$$

with each other to extract '15' which is the component in the computation matrix, which does not match the substitution matrix as the first component, and when the first component '15' is extracted, the management terminal 10 applies the first component '15' to the hash function stored in the memory as the input to calculate the first hash value, and then decrypt the at least one encrypted first Internet blocking history information based on the first hash value.

Through this, the administrator confirms the at least one first Internet blocking history information through the management terminal 10 to monitor at which time and which webpage the first electronic terminal 20 attempts accessing.

According to an exemplary embodiment of the present disclosure, the Internet access management service server 110 may additionally include a component that enables the use of the application of the first electronic terminal 20 to be restricted.

In this regard, the Internet access management service server 110 may receive list information of an application which becomes a predetermined blocking subject from the management terminal 10, and transmits the list information therefor to the first electronic terminal 20 to provide a function which enables the first electronic terminal 20 to block the use of the application included in the list information.

For example, when the Internet access management service server 110 receives list information which becomes a blocking subject for a gambling application, a cryptocurrency application, etc., from the management terminal 10, the Internet access management service server 110 transmits the list information therefor to the first electronic terminal 20 to process the first electronic terminal 20 not to execute the application.

The Internet access management service server 110 of the present disclosure receives predetermined application execution blocking time information from the management terminal 10, and then transmits the time information to the first electronic terminal 20 to process the first electronic terminal 20 not to drive the application at the application execution blocking time.

Figure 2:
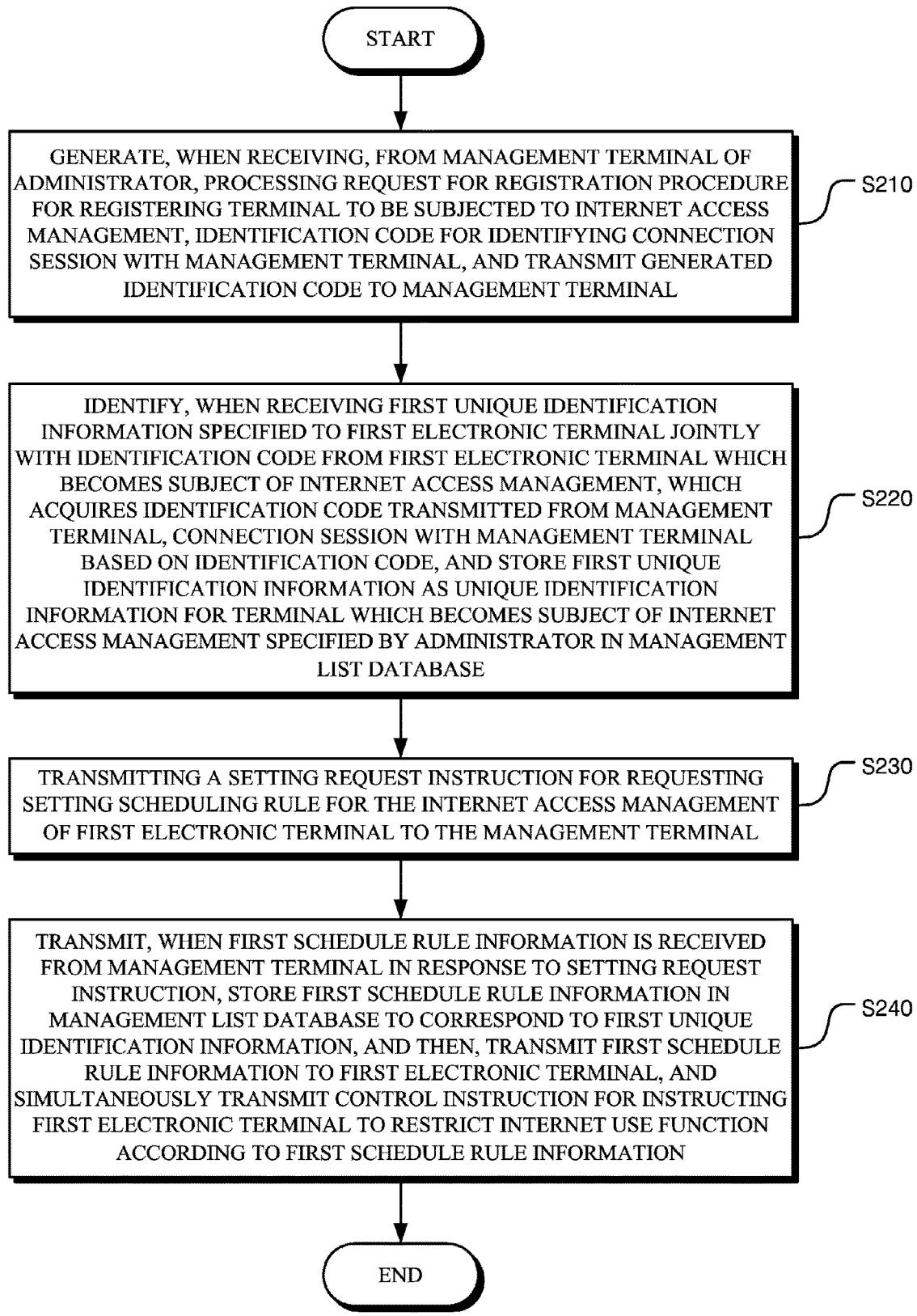
FIG. 2 is a flowchart illustrating the operating method of an Internet access management service server that can manage internet access for electronic terminals through setting of scheduling rules for Internet use restriction according to an exemplary embodiment of the present disclosure.

FIG. 2 is a flowchart illustrating the operating method of an Internet access management service server that can manage internet access for electronic terminals through setting of scheduling rules for Internet use restriction according to an exemplary embodiment of the present disclosure.

In step S210, when receiving, from the management terminal of the administrator, a processing request for a registration procedure for registering a terminal to be subjected to the Internet access management, an identification code for identifying a connection session with the management terminal is generated, and the generated identification code is transmitted to the management terminal.

In step S220, when receiving first unique identification information specified to a first electronic terminal jointly with the identification code from the first electronic terminal which becomes the subject of the Internet access management, which acquires the identification code transmitted from the management terminal, the connection session with the management terminal is identified based on the identification code, and the first unique identification information as the unique identification information for the terminal which becomes the subject of the Internet access management specified by the administrator is stored in the management list database.

In step S230, a setting request instruction for requesting setting a scheduling rule for the Internet access management of the first electronic terminal is transmitted to the management terminal.

In step S240, when first schedule rule information (the first schedule rule information is information constituted by a filtering rule for identifying a webpage which becomes a subject of access blocking and information on an Internet use restriction time) is received from the management terminal in response to the setting request instruction, the first schedule rule information is stored in the management list database to correspond to the first unique identification information, and then, the first schedule rule information is transmitted to the first electronic terminal, and simultaneously a control instruction for instructing the first electronic terminal to restrict an Internet use function according to the first schedule rule information is transmitted.

In this case, according to an exemplary embodiment of the present disclosure, when the management terminal receives the identification code from the Internet access management service server, the management terminal may generate a 2D code inserted with the identification code, and display the 2D code on the screen, and in this case, the first electronic terminal may acquire the identification code by scanning the 2D code displayed on the screen of the management terminal through a camera mounted on the first electronic terminal, and then extract, when the identification code is acquired, the first unique identification information specified to the first electronic terminal, and transmit the first unique identification information to the Internet access management service server jointly with the identification code.

According to an exemplary embodiment of the present disclosure, the filtering rule as a rule configured based on a plurality of first blocking keywords set by the administrator may be a rule specified to block the access of the first electronic terminal to a first web page when if the first electronic terminal attempts to access the first web page, it is judged that there is at least one word in which a word similarity (the word similarity as a similarity calculated based on an embedding vector for each word generated by performing word embedding based on a semantic similarity mutually predetermined between words means a vector similarity between embedding vectors specified in respective words) with the plurality of first blocking keywords within the domain name of the first webpage and the text body of the first webpage is equal to or more than a predetermined reference value.

According to an exemplary embodiment of the present disclosure, when the first electronic terminal receives the first schedule rule information and the control instruction from the Internet access management service server, the first electronic terminal may restrict the Internet use of the first electronic terminal according to the first schedule rule information based on the control instruction, and generate Internet blocking history information constituted by date/time information for a time when Internet access blocking occurs and information on a blocked webpage whenever the Internet access blocking according to the first schedule rule information occurs, and feed back the generated Internet blocking history information to the Internet access management service server.

In this case, the operating method of the Internet access management service server may further include a step of storing the Internet blocking history information in the management list database to correspond to the first unique identification information whenever the Internet blocking history information is fed back from the first electronic terminal.

In this case, according to an exemplary embodiment of the present disclosure, the operating method of the Internet access management service server may further include: a step of maintaining an authentication information storage unit storing n (n is a natural number of 2 or more) digits of predetermined authentication number and predetermined hash functions which are shared in advance with the management terminal; a step of extracting, when receiving, from the management terminal, a providing request instruction of Internet blocking history information for the first electronic terminal during a predetermined first period, from the management list database, at least one first Internet blocking history information including date/time information which belongs to the first period among the Internet blocking history information stored to correspond to the first unique identification information from the management list database; randomly generating an n-digit serial number, and then generates a column vector having each digit of numbers constituting the serial number as a component and a row vector having each digit of numbers constituting the authentication number as a component, and computing a matrix multiplication between the column vector and the row vector to generate an n×n size computation matrix, and then randomly selecting a first component which is one of the components constituting the computation matrix, and applying the first component to the hash function as an input to generate a first hash value, and encrypting the at least one first Internet blocking history information based on the first hash value; and a step of substituting the first component with a randomly generated dummy component (the dummy component is generated as a different value from the first component) to generate a substitution matrix in the computation matrix, and encrypting each of the substitution matrix and the serial number with a predetermined public key (a private key forming a key pair with the public key is stored in the management terminal), and then transmitting the encrypted substitution matrix and the encrypted serial number to the management terminal, and at the same time, transmitting the at least one encrypted first Internet blocking history information to the management terminal.

In this case, the management terminal may store, in advance, the private key, the authentication number, and the hash function in the memory, decrypts, when receiving, from the Internet access management service server, the encrypted substitution matrix, the encrypted serial number, and the at least one encrypted first Internet blocking history information, each of the substitution matrix encrypted and the serial number encrypted based on the private key, and then generate a column vector having respective digits of numbers constituting the decrypted serial number as the component and a row vector having respective digits of numbers constituting the authentication number stored in the memory as the component, and computes the matrix multiplication between the column vector and the row vectors to generate the computation matrix having an n×n size, and then compare the computation matrix and the decrypted substitution matrix, and extract a component in the computation matrix, which does not match the substitution matrix as the first component, and apply the first component to the hash function stored in the memory as the input to calculate the first hash value, and then decrypt the at least one encrypted first Internet blocking history information based on the first hash value.

Hereinabove, referring to FIG. 2, the operating method of the Internet access management service server according to an exemplary embodiment of the present disclosure is described. Here, since the operating method of the Internet access management service server according to an exemplary embodiment of the present disclosure may correspond to the configuration of the operation of the Internet access management service server 110 described by using FIG. 1, a more detailed description thereof will be omitted.

The operating method of the Internet access management service server according to an exemplary embodiment of the present disclosure may be implemented by a computer program stored in a storage medium for executing the computer program through coupling with a computer.

The operating method of the Internet access management service server according to an exemplary embodiment of the present disclosure may be implemented in a program command type which may be performed through various computer means and recorded in a computer readable medium. The computer readable medium may include a program command, a data file, a data structure, etc., singly or combinationally. The program command recorded in the medium may be specially designed and configured for the present disclosure, or may be publicly known to and used by those skilled in the computer software field. An example of the computer readable recording medium includes magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program command. An example of the program command includes a high-level language code executable by a computer by using an interpreter and the like, as well as a machine language code created by a compiler.

As described above, the present disclosure has been described by specified matters such as detailed components, and the like and limited exemplary embodiments and drawings, but the description is just provided to assist more overall understanding of the present disclosure and the present disclosure is not limited to the exemplary embodiment and various modifications and changes can be made by those skilled in the art from such a disclosure.

Accordingly, the spirit of the present disclosure should not be defined only by the described exemplary embodiments, and it should be appreciated that claims to be described below and all which are equivalent to the claims or equivalently modified are included in the scope of the present disclosure.

What is claimed is:

1. An Internet access management service server that can manage internet access for electronic terminals through setting of scheduling rules for Internet use restriction, comprising:

a memory; and a processor, coupled to the memory, when executed, performs operations of:

when receiving from a management terminal of an administrator, a processing request for a registration procedure for registering a terminal to be subjected to Internet access management, generating, by a code transmission unit, an identification code for identifying a connection session with the management terminal, and transmitting the generated identification code to the management terminal;

when receiving first unique identification information specified to a first electronic terminal jointly with the identification code from the first electronic terminal which becomes the subject of the Internet access management, which acquires the identification code transmitted from the management terminal, identifying, by a registration unit, the connection session with the management terminal based on the identification code, and storing the first unique identification information as the unique identification information for the terminal which becomes the subject of the Internet access management specified by the administrator in a management list database;

transmitting, by a setting request unit, a setting request instruction for requesting setting a scheduling rule for the Internet access management of the first electronic terminal to the management terminal; and when first schedule rule information is received from the management terminal in response to the setting request instruction, storing, by an instruction transmission unit, the first schedule rule information in the management list database to correspond to the first unique identification information, and transmitting the first schedule rule information to the first electronic terminal, simultaneously transmitting a control instruction for instructing the first electronic terminal to restrict an Internet use function according to the first schedule rule information, wherein the first schedule rule information is information constituted by a filtering rule for identifying a webpage which becomes a subject of access blocking and information on an internet use restriction time, and wherein the first electronic terminal blocks an access to the webpage identified in the first schedule rule information and restricts an internet access during the internet use restriction time identified in the first schedule rule information.

2. The Internet access management service server of claim 1, wherein when the management terminal receives the identification code from the Internet access management service server, the management terminal may generate a 2D code inserted with the identification code, and display the 2D code on the screen, and in this case, the first electronic terminal acquires the identification code by scanning the 2D code displayed on the screen of the management terminal through a camera mounted on the first electronic terminal, and then extracts, when the identification code is acquired, the first unique identification information specified to the first electronic terminal, and transmits the first unique identification information to the Internet access management service server jointly with the identification code.

3. The Internet access management service server of claim 1, wherein the filtering rule as a rule configured based on a plurality of first blocking keywords set by the administrator means a rule specified to block the access of the first electronic terminal to a first web page when if the first electronic terminal attempts to access the first web page, it is judged that there is at least one word in which a word similarity, wherein the word similarity as a similarity calculated based on an embedding vector for each word generated by performing word embedding based on a semantic similarity mutually predetermined between words means a vector similarity between embedding vectors specified in respective words, with the plurality of first blocking keywords within the domain name of the first webpage and the text body of the first webpage is equal to or more than a predetermined reference value.

4. The Internet access management service server of claim 1, wherein when the first electronic terminal receives the first schedule rule information and the control instruction from the Internet access management service server, the first electronic terminal may restrict the Internet use of the first electronic terminal according to the first schedule rule information based on the control instruction, and generate Internet blocking history information constituted by date/time information for a time when Internet access blocking occurs and information on a blocked webpage whenever the Internet access blocking according to the first schedule rule information occurs, and feed back the generated Internet blocking history information to the Internet access management service server, and the Internet access management service server further includes a history information storage processing unit storing the Internet blocking history information in the management list database to correspond to the first unique identification information whenever the Internet blocking history information is fed back from the first electronic terminal.

5. The Internet access management service server of claim 4, further comprising:

an authentication information storage unit storing n, wherein n is a natural number of 2 or more, digits of predetermined authentication number and predetermined hash functions which are shared in advance with the management terminal;

an information extraction unit extracting, when receiving a providing request instruction of the Internet blocking history information for the first electronic terminal during a predetermined first period from the management terminal, from the management list database, at least one first Internet blocking history information including date/time information which belongs to the first period among the Internet blocking history information stored to correspond to the first unique identification information;

an encryption unit randomly generating an n-digit serial number, and then generates a column vector having each digit of numbers constituting the serial number as a component and a row vector having each digit of numbers constituting the authentication number as a component, and computing a matrix multiplication between the column vector and the row vector to generate an n×n size computation matrix, and then randomly selecting a first component which is one of the components constituting the computation matrix, and applying the first component to the hash function as an input to generate a first hash value, and encrypting the at least one first Internet blocking history information based on the first hash value; and an information transmission unit substituting the first component with a randomly generated dummy component, wherein the dummy component is generated as a different value from the first component, to generate a substitution matrix in the computation matrix, and encrypting each of the substitution matrix and the serial number with a predetermined public key, wherein a private key forming a key pair with the public key is stored in the management terminal, and then transmitting the encrypted substitution matrix and the encrypted serial number to the management terminal, and at the same time, transmitting the at least one encrypted first Internet blocking history information to the management terminal, wherein the management terminal stores, in advance, the private key, the authentication number, and the hash function in the memory, decrypts, when receiving, from the Internet access management service server, the encrypted substitution matrix, the encrypted serial number, and the at least one encrypted first Internet blocking history information, each of the substitution matrix and the serial number based on the private key, and then generates a column vector having respective digits of numbers constituting the decrypted serial number as the component and a row vector having respective digits of numbers constituting the authentication number stored in the memory as the component, and computes the matrix multiplication between the column vector and the row vectors to generate the computation matrix having an n×n size, and then compare the computation matrix and the decrypted substitution matrix, and extract a component in the computation matrix, which does not match the substitution matrix as the first component, and applies the first component to the hash function stored in the memory as the input to calculate the first hash value, and then decrypt the at least one encrypted first Internet blocking history information based on the first hash value.

6. An operating method of an Internet access management service server that can manage internet access for electronic terminals through setting of scheduling rules for Internet use restriction, comprising:

generating, when receiving from a management terminal of an administrator, a processing request for a registration procedure for registering a terminal to be subjected to Internet access management, an identification code for identifying a connection session with the management terminal, and transmitting the generated identification code to the management terminal;

identifying, when receiving first unique identification information specified to a first electronic terminal jointly with the identification code from the first electronic terminal which becomes the subject of the Internet access management, which acquires the identification code transmitted from the management terminal, the connection session with the management terminal based on the identification code, and storing the first unique identification information as the unique identification information for the terminal which becomes the subject of the Internet access management specified by the administrator in a management list database;

transmitting a setting request instruction for requesting setting a scheduling rule for the Internet access management of the first electronic terminal to the management terminal; and storing, when first schedule rule information is received from the management terminal in response to the setting request instruction, the first schedule rule information in the management list database to correspond to the first unique identification information, transmitting the first schedule rule information to the first electronic terminal, and simultaneously transmitting a control instruction for instructing the first electronic terminal to restrict an Internet use function according to the first schedule rule information, wherein the first schedule rule information is information constituted by a filtering rule for identifying a webpage which becomes a subject of access blocking and information on an internet use restriction time, and wherein the first electronic terminal blocks an access to the webpage identified in the first schedule rule information and restricts an internet access during the Internet use restriction time identified in the first schedule rule information.

7. The operating method of claim 6, wherein when the management terminal receives the identification code from the Internet access management service server, the management terminal may generate a 2D code inserted with the identification code, and display the 2D code on the screen, and in this case, the first electronic terminal acquires the identification code by scanning the 2D code displayed on the screen of the management terminal through a camera mounted on the first electronic terminal, and then extracts, when the identification code is acquired, the first unique identification information specified to the first electronic terminal, and transmits the first unique identification information to the Internet access management service server jointly with the identification code.

8. The operating method of claim 6, wherein the filtering rule as a rule configured based on a plurality of first blocking keywords set by the administrator means a rule specified to block the access of the first electronic terminal to a first web page when if the first electronic terminal attempts to access the first web page, it is judged that there is at least one word in which a word similarity, wherein the word similarity as a similarity calculated based on an embedding vector for each word generated by performing word embedding based on a semantic similarity mutually predetermined between words means a vector similarity between embedding vectors specified in respective words, with the plurality of first blocking keywords within the domain name of the first webpage and the text body of the first webpage is equal to or more than a predetermined reference value.

9. The operating method of claim 6, wherein when the first electronic terminal receives the first schedule rule information and the control instruction from the Internet access management service server, the first electronic terminal may restrict the Internet use of the first electronic terminal according to the first schedule rule information based on the control instruction, and generate Internet blocking history information constituted by date/time information for a time when Internet access blocking occurs and information on a blocked webpage whenever the Internet access blocking according to the first schedule rule information occurs, and feed back the generated Internet blocking history information to the Internet access management service server, and the operating method of the Internet access management service server further includes storing the Internet blocking history information in the management list database to correspond to the first unique identification information whenever the Internet blocking history information is fed back from the first electronic terminal.

10. The operating method of claim 9, further comprising:

maintaining an authentication information storage unit storing n, wherein n is a natural number of 2 or more, digits of predetermined authentication number and predetermined hash functions which are shared in advance with the management terminal;

extracting, when receiving a providing request instruction of the Internet blocking history information for the first electronic terminal during a predetermined first period from the management terminal, from the management list database, at least one first Internet blocking history information including date/time information which belongs to the first period among the Internet blocking history information stored to correspond to the first unique identification information;

randomly generating an n-digit serial number, and then generates a column vector having each digit of numbers constituting the serial number as a component and a row vector having each digit of numbers constituting the authentication number as a component, and computing a matrix multiplication between the column vector and the row vector to generate an n×n size computation matrix, and then randomly selecting a first component which is one of the components constituting the computation matrix, and applying the first component to the hash function as an input to generate a first hash value, and encrypting the at least one first Internet blocking history information based on the first hash value; and substituting the first component with a randomly generated dummy component, wherein the dummy component is generated as a different value from the first component, to generate a substitution matrix in the computation matrix, and encrypting each of the substitution matrix and the serial number with a predetermined public key, wherein a private key forming a key pair with the public key is stored in the management terminal, and then transmitting the encrypted substitution matrix and the encrypted serial number to the management terminal, and at the same time, transmitting the at least one encrypted first Internet blocking history information to the management terminal, wherein the management terminal stores, in advance, the private key, the authentication number, and the hash function in the memory, decrypts, when receiving, from the Internet access management service server, the encrypted substitution matrix, the encrypted serial number, and the at least one encrypted first Internet blocking history information, each of the substitution matrix and the serial number based on the private key, and then generates a column vector having respective digits of numbers constituting the decrypted serial number as the component and a row vector having respective digits of numbers constituting the authentication number stored in the memory as the component, and computes the matrix multiplication between the column vector and the row vectors to generate the computation matrix having an n×n size, and then compare the computation matrix and the decrypted substitution matrix, and extract a component in the computation matrix, which does not match the substitution matrix as the first component, and applies the first component to the hash function stored in the memory as the input to calculate the first hash value, and then decrypt the at least one encrypted first Internet blocking history information based on the first hash value.

11. A non-transitory computer readable recording medium having a program recorded therein for allowing a computer to execute an operating method of an Internet access management service server that can manage internet access for electronic terminals through setting of scheduling rules for Internet use restriction, comprising:

generating, when receiving, from a management terminal of an administrator, a processing request for a registration procedure for registering a terminal to be subjected to Internet access management, an identification code for identifying a connection session with the management terminal, and transmitting the generated identification code to the management terminal;

identifying, when receiving first unique identification information specified to a first electronic terminal jointly with the identification code from the first electronic terminal which becomes the subject of the Internet access management, which acquires the identification code transmitted from the management terminal, the connection session with the management terminal based on the identification code, and storing the first unique identification information as the unique identification information for the terminal which becomes the subject of the Internet access management specified by the administrator in a management list database;

transmitting a setting request instruction for requesting setting a scheduling rule for the Internet access management of the first electronic terminal to the management terminal; and storing, when first schedule rule information is received from the management terminal in response to the setting request instruction, the first schedule rule information in the management list database to correspond to the first unique identification information, transmitting the first schedule rule information to the first electronic terminal, and simultaneously transmitting a control instruction for instructing the first electronic terminal to restrict an Internet use function according to the first schedule rule information, wherein the first schedule rule information is information constituted by a filtering rule for identifying a webpage which becomes a subject of access blocking and information on an internet use restriction time, and wherein the first electronic terminal blocks an access to the webpage identified in the first schedule rule information and restricts an internet access during the internet use restriction time identified in the first schedule rule information.

* * * * *